United States Patent [19]

Roth

[11] 4,138,768

[45] Feb. 13, 1979

[54] APPARATUS AND METHOD FOR FORMING MEAT PATTIES

[76] Inventor: Eldon N. Roth, 1025 Tennessee St., San Francisco, Calif. 94107

[21] Appl. No.: 778,492

[22] Filed: Mar. 17, 1977

[51] Int. Cl.² ............................................. A22C 7/00
[52] U.S. Cl. ....................................... 17/32; 425/404
[58] Field of Search ................... 17/32; 425/377, 404

[56] References Cited

U.S. PATENT DOCUMENTS

| | | | |
|---|---|---|---|
| 1,806,066 | 5/1931 | Kremmling | 17/32 |
| 2,539,232 | 1/1951 | Dempster | 17/32 |
| 2,634,458 | 4/1953 | Elshesser | 17/32 |
| 2,670,296 | 11/1954 | Tansley | 17/32 |
| 2,708,287 | 5/1955 | Long et al. | 17/32 |
| 2,814,921 | 12/1957 | Beerend | 17/32 |
| 2,837,761 | 6/1958 | Stiegler | 17/32 |
| 3,137,029 | 6/1964 | De Zolt | 17/32 |
| 3,731,345 | 5/1973 | Brackman | 17/32 |
| 3,750,232 | 8/1973 | Holly | 17/32 |
| 3,898,026 | 8/1975 | Sauer et al. | 425/377 |

Primary Examiner—Russell R. Kinsey
Assistant Examiner—Paul J. Hirsch
Attorney, Agent, or Firm—Fitch, Even, Tabin & Luedeka

[57] ABSTRACT

A ground meat product extruded upon the outer surface of a continuously rotating refrigerated drum and compressed to a desired thickness by compression rolls spaced from the drum surface is stripped from the surface as a frozen meat sheet which passes over an expandable resilient apron to the patty former which includes a plurality of reciprocating cutters arranged in one or more banks across the path of the moving sheet of frozen meat. Frozen patties thus formed by the reciprocating cutters slide onto a conveyor belt and are carried to the next station, e.g., packaging, while the waste sections between the cut patties drop to another conveyor belt that returns them to be re-ground for reprocessing in the system.

11 Claims, 7 Drawing Figures

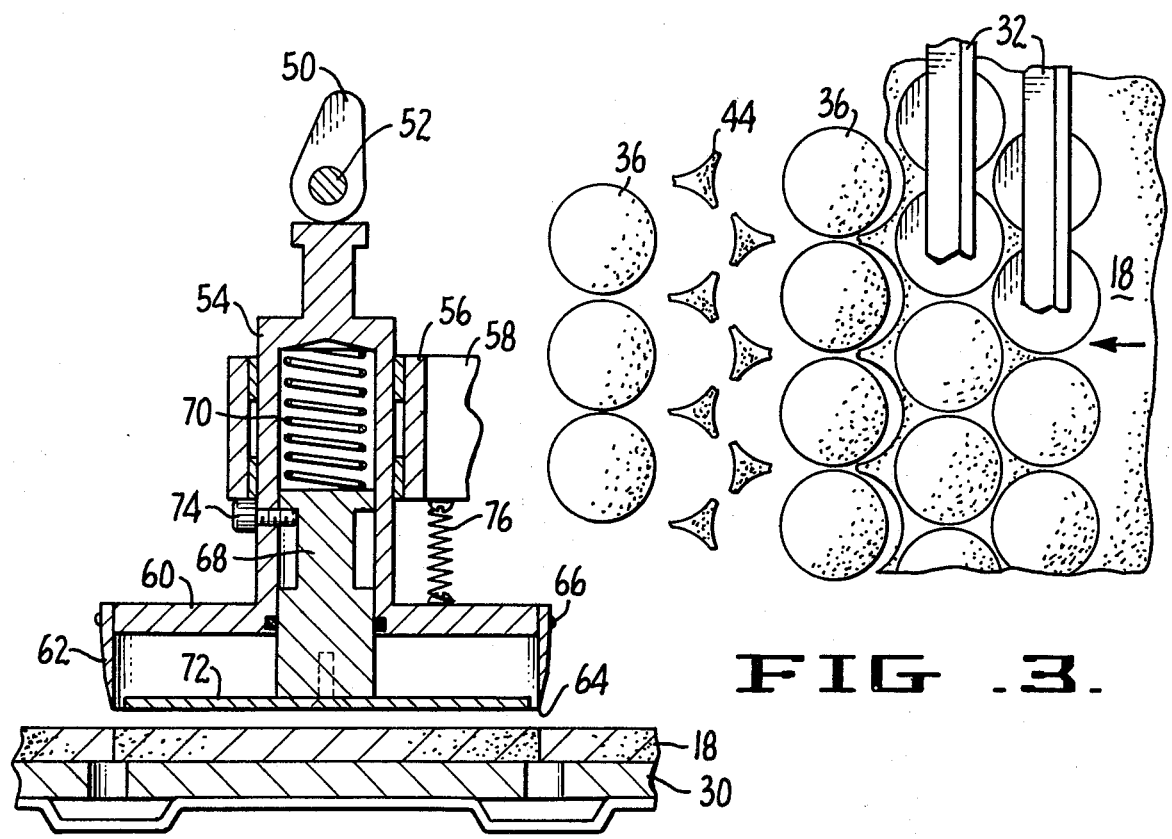
FIG. 3.
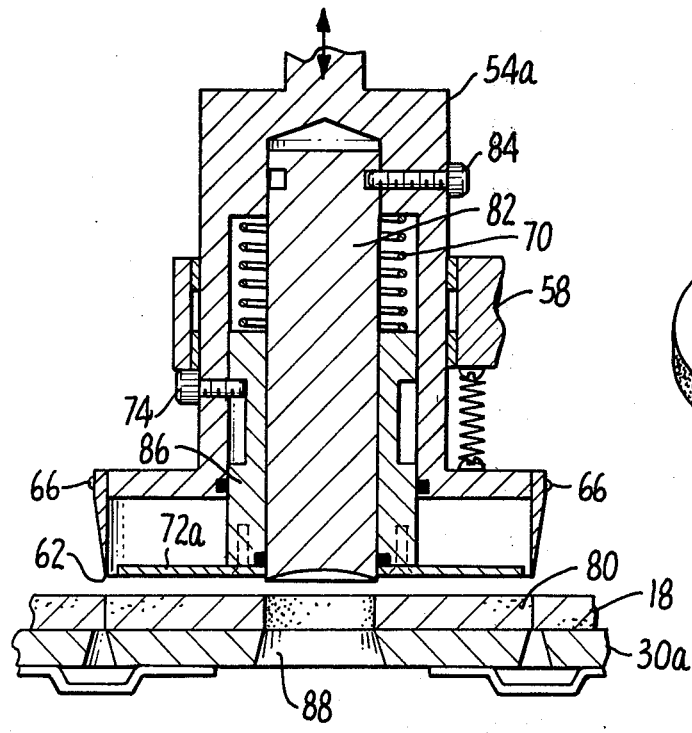
FIG. 2.
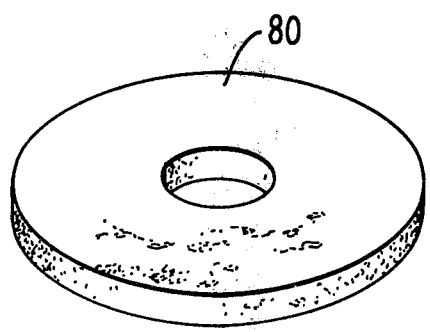
FIG. 5.
FIG. 4.

APPARATUS AND METHOD FOR FORMING MEAT PATTIES

CROSS-REFERENCE TO RELATED APPLICATIONS

The invention described herein is related to the applicant's copending patent application, Ser. No. 688,599, filed May 21, 1976 for "Refrigeration Apparatus for Viscous Paste Substance" now U.S. Pat. No. 4,098,095. That copending application describes a refrigerated drum of the type used in this present invention, but which was developed for freezing a warm viscous meat protein paste that had previously been heated to render and remove all fat materials.

BACKGROUND OF THE INVENTION

This invention relates to food production and particularly to the apparatus and method for freezing a sheet of a comminuted meat product and for automatically cutting and forming serving size patties from the frozen sheet.

Many different types of processors have been developed for automatically and rapidly forming individual servings of ground meat products which are later frozen, packaged and marketed for eventual use as, for example, hamburger steaks or sandwich patties, Salisbury steaks, buttered steaks, etc. In the production of virtually all of this type of convenience food, the product is cut and formed while it is at a room temperature and, ultimately, frozen and packaged. For example, U.S. Pat. No. 3,347,176 describes an automatic patty press that molds meat at room temperature into non-compacted patties that are later frozen and packaged. Other types of patty-forming apparatus overcome the dangers inherent in permitting ground or chopped meat to be processed at room temperatures and therefore utilize refrigerated die members to simultaneously form and freeze the room temperature meat. For example, U.S. Pat. No. 3,852,507 describes equipment that presses meat between refrigerated die members to form a loaf having a uniform cross-section that is frozen to a depth of approximately one-eighty of an inch for facilitating subsequent slicing, freezing and packaging. Still another type, such as that described in U.S. Pat. No. 3,463,924, extrudes and spreads the ground meat product on a refrigerated endless belt which passes beneath rotary blades that score the frozen meat which may later be broken into rectangular serving portions.

SUMMARY OF THE INVENTION

In the method and apparatus of the present invention, the ground meat product is spread to the desired thickness on the outer surface of a refrigerated rotating drum where it is frozen and stripped from the drum surface to slide along an expandable resilient apron to the patty former which includes one or more rows of reciprocating cutters which punch patties of the desired configuration from the moving frozen sheet of meat. The patties thus formed slide to a conveyor that carry them to the next processing station, while the waste sections between the cut patties drop to another conveyor that returns them to be re-ground along with new unfrozen meat.

BRIEF DESCRIPTION OF THE DRAWINGS

In the drawings which illustrate a preferred embodiment of the invention:

FIG. 2 is a sectional elevation view of one of the reciprocating punches;

FIG. 3 is a plan view of the punch area of the apparatus illustrating the operation of two banks of staggered reciprocating punches;

FIG. 4 is a sectional elevation view illustrating an alternate embodiment of a reciprocating punch for forming circular patties with a central hole therethrough;

FIG. 5 is a perspective view illustrating a patty formed with the reciprocating punch of FIG. 4;

DESCRIPTION OF THE ILLUSTRATED EMBODIMENT

Figure 1:
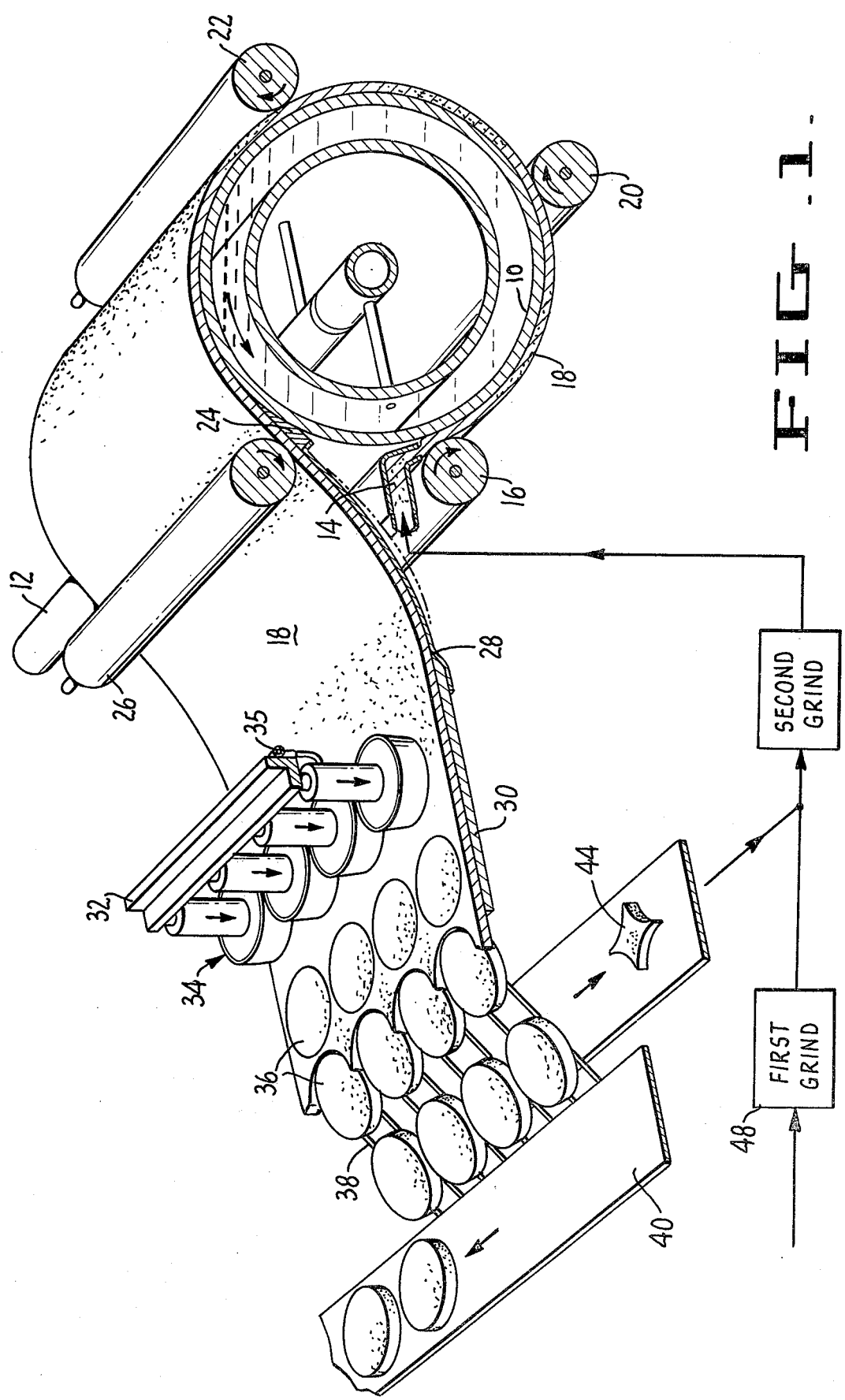
FIG. 1 is a perspective view illustrating the apparatus of the invention.

Turning now to the illustrated embodiment of the invention, FIG. 1 is a perspective view illustrating a drum 10 rotatable about a hollow shaft 12 in which a suitable refrigerant is admitted into the interior area of the drum to rapidly chill the material on the arcuate surface of the drum. Preferably, the surface of drum 10 is constructed of a thin metallic sheet of high heat conductive material so that a ground meat product forced through the inlet nozzle 14 and into the nip between an inlet roll 16 and the drum surface will adhere to the drum surface and become frozen, or substantially frozen, within one revolution of the drum.

The ground meat product 18 which may, if desired, be combined with various seasonings, grains, etc., to produce specialty items, is forced through the nozzle 14 and into the nip between the roll 16 and drum 10, at room temperature or, as will be subsequently explained, slightly below that temperature. When forced against the freezing surface of the drum 10, the moist product will adhere to that surface. Downstream from the inlet roll 16 is a compression roll 20 and yet further downstream is a second compression roll 22. The purpose of the rolls 20 and 22 is to compact the freezing meat on the drum surface to the desired thickness and also to assure that the meat continues to adhere to the drum surface.

Spaced further downstream and as closely as practical to the inlet nozzle 14 is a knife-edged scraper blade 24 which strips the sheet or layer of the frozen ground meat product 18 from the drum surface where it passes beneath a guide roll 26 and over a flexible resilient apron 28 to the patty-forming table 30.

The flexible resilient apron 28 is preferably a thin stainless steel sheet having a width corresponding to the width of the drum 10 and a length of approximately one and one-half feet. The apron 28 is attached at one end to the structural member (not shown) that supports the scraper blade 24 near the guide roll 26 while the downstream or opposite end of the apron 28 loosely engages the lower surface of the patty-forming table 30 so that it may be permitted to slide away from the table 30 when the sheet or layer of frozen meat product 18, continually moving from the drum 10, is momentarily halted by the action of the reciprocating cutters at the patty-forming table 30. Thus, the resilient apron 28 between the guide roll 26 and the reciprocating punches enables the meat layer to pass over the patty-forming table 30 without danger of fracturing or buckling.

Mounted above the patty-forming table 30 upon a suitable structural member 32 are one or more banks of reciprocating punches, such as the single bank of four punches 34 illustrated in FIG. 1. In the FIG. 1 embodiment, the punches 34 are pneumatically operated by individual cylinders, with one cylinder being provided for each punch, and the member 32 carries a manifold 35 to supply air to the cylinders. As the frozen layer of the ground meat product 18 passes from the surface of the resilient apron 28 and onto the patty-forming table 30, the punches 34 are actuated to form circular patties 36 which, after being cut from the frozen sheet, pass down slides 38 onto a conveyor belt 40 where they are conveyed to the next processing station, such as the packaging station. The slides 38 are preferably metal strips that are approximately one-half the width of the patty and are aligned directly downstream of each cutter or punch 34 so that there is a space between adjacent slides approximately equal to the width of the slides. The circular patties 36, upon being cut from the frozen layer of meat 18, produce small waste portions 44 of frozen meat. Because of their small size, these waste portions 44 readily drop through the spaces between the narrow slides 38 which guide the patties 36 to the conveyor 40. The waste portions 44 are then conveyed and mixed and ground at grinder 46 with new incoming meat product received from grinder 48. The frozen waste portions 44, while being thoroughly mixed with the new incoming meat product, absorb some of the heat from the new meat product, thereby lowering the temperature of the entire mixture introduced onto the drum 10 through the inlet nozzle 14. Thus, the waste portions 44 from the ground meat product 18 not only are recovered but, also, serve to refrigerate incoming meat so that, when applied to the refrigerated drum 10, rapid freezing of the combined mixture is promoted.

FIG. 2 is a sectional elevation view of a mechanically actuated reciprocating cutter which is actuated by a cam 50 revolving on an externally rotated cam shaft 52. Cam 50 is in contact with the top surface of a tubular piston member 54, the external tubular surface of which is slidably mounted within a cylinder 56 attached to a structural member 58 suitably positioned above the patty-forming table 30. The lower end of the tubular piston 54 is provided with a flange 60 which has a peripheral dimension and configuration corresponding to the size and shape of the desired patty. Thus, for a typical sandwich hamburger patty, the flange 60 would be circular and approximately four inches in diameter and, for other patties such as buttered steaks, would be oval or elliptical with dimensions of approximately a three-inch width and a six-inch length.

Removably connected to the periphery of the flange 60 is a cutter 62 shaped to conform to the flange 60 and the patty to be cut and provided with a sharpened cutting edge 64. The cutter 62 is attached to the flange 60 by screws 66 so that the cutter 62 may be readily removed from the flange for sharpening or replacing, as required, or for cleaning of the interior of the cutter.

Mounted within the bore of the tubular piston 54 is a stripper plate rod 68, the top end of which is spring-loaded by the compression spring 70 and the bottom end of which supports a stripper plate 72 having a diameter slightly less than that of the cutter 62. The stripper plate rod 68 is provided with a circumferential groove so that a set screw 74, extending through the wall of the piston 54 and into that groove, will prevent the accidental removal of the stripper plate piston 68 and its supporting plate 72.

In operation, rotation of the cam shaft 52 urges cam 50 against the top surface of the tubular piston 54, thereby forcing the piston 54, together with the cutter 62, through the layer of frozen meat 18. As the cutter 62 is forced downward, the stripper plate 72 contacts the top surface of the meat layer 18, forcing the contraction of the spring 70. Further rotation of shaft 52 releases the downward force against the piston 54 and a spring 76, coupled between the flange 60 and the structural member 58, lifts the cutter and its associated assembly from the surface of the formed meat patty. Spring 70 continues to exert force against the top of the piston 68 and stripper plate 72, therefore holding the formed patty down against the top surface of the patty-forming table 30 until the cutter 62 has been completely removed from the layer of frozen meat product 18.

The punches illustrated in FIG. 1 have been shown to be in a single bank of four units. Obviously, the number of punches may be increased or decreased as needed and as determined by the width of the frozen meat layer 18 and the size of the punches. As shown in FIG. 3, the punches may be arranged in two or more rows or banks and may be staggered or meshed together so that the waste portions 44 between the formed patties 36 are smaller than those produced by a single row of punches 34, as shown in FIG. 1.

Illustrated in FIG. 4 is an alternate design for a punch which produces the novelty-shaped patty 80 illustrated in FIG. 5. The punch illustrated in FIG. 4 is similar to that illustrated in FIG. 2 except that a solid circular rod 82 is rigidly attached by a screw 84 to the wall of the tubular piston 54. The rod 82 is sharpened at its lower end so that it will punch the center hole as shown in FIG. 5. The stripper plate 72a of FIG. 4 is connected to the lower end of a sliding tube 86 which is mounted within the bore of the tubular piston 54a and functions the same as the stripper plate rod 68 as described in connection with FIG. 2. In the embodiment illustrated in FIG. 4, the patty-forming table 30a is provided with suitable apertures 88 that are aligned coaxial with the cutting rod 82 so that, upon actuation of the punch, the center or waste portion of the patty 80 will be permitted to drop through an aperture 88 onto a suitable conveyor which will carry it back for reprocessing through the system as previously described.

Figure 6:
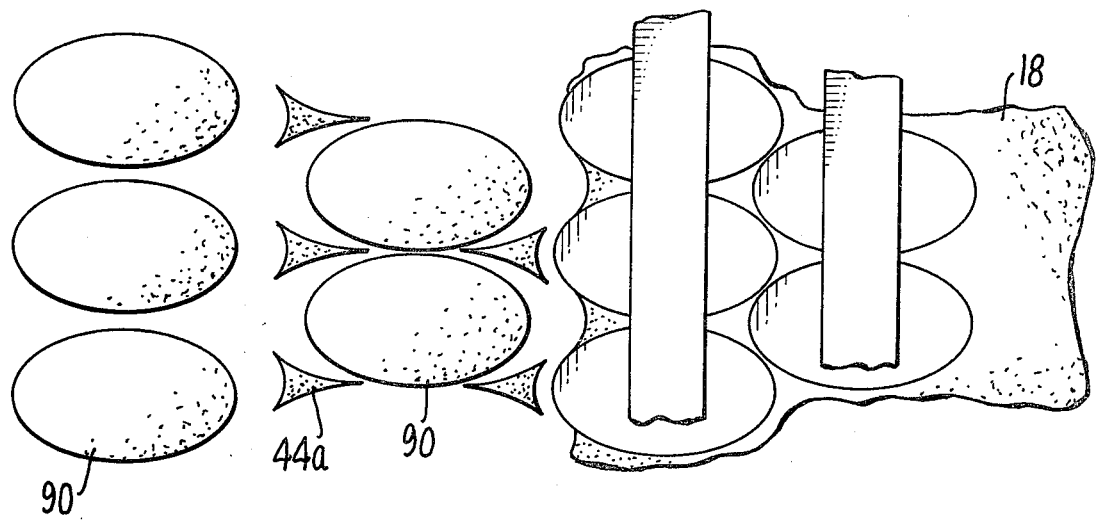
FIG. 6 is a perspective view illustrating the formation of frozen oval or elliptical patties.

FIG. 6 illustrates a typical arrangement for staggering two rows of reciprocating cutters containing oval or elliptical cutter blades for cutting and forming meat products commonly known as buttered steaks, Salisbury steaks, chopped cutlets, etc. It will be noted that the waste portion 44a between the patties is relatively small, so that a minimum amount of the meat product will be returned for reprocessing.

Figure 7:
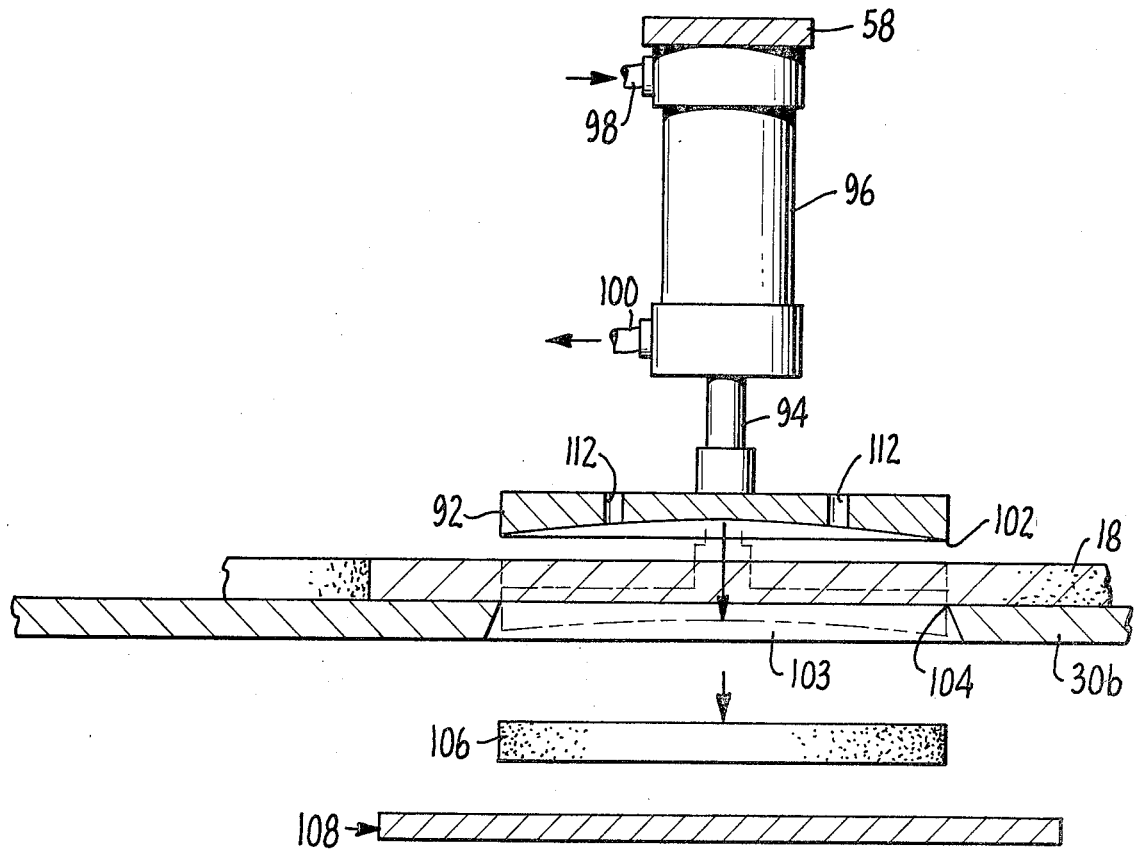
FIG. 7 is an elevation view illustrating an alternate press configuration using a pneumatic piston actuator for punching out circular patties from the frozen sheet.

FIG. 7 is an elevation view of a pneumatically operated reciprocating cutter and illustrates the cutter 92 connected to the reciprocating shaft 94, the other end of which is connected to a piston (not shown) within the cylinder 96. Cylinder 96, necessarily, is connected to a stationary structural member 58 and its intake port 98 and exhaust port 100 are suitably connected to a pneumatic source and control (not shown). The cutter 92 of the embodiment illustrated in FIG. 7 is different from that previously described in connection with FIGS. 2 and 4 in that the cutter 92 is a solid tool steel plate having a concave lower surface that provides a sharp lower cutting edge 102 and the table 30b is formed with openings 103. The edge 102 of the cutter 92 mates with and cooperates with a corresponding edge 104 of the opening 103 so that, upon actuation of the cutter 92, the layer of frozen meat product 18 is sharply broken between these edges to form the desired meat patty 106 and thereupon passes through the table 30b and drops to the belt conveyor 108. Because the cutter 92 is a solid plate and not a ring cutter with a stripper plate, as described in connection with FIGS. 2 and 4, the lower concave surface of the cutter 92 may, upon occasion, become vacuum sealed to the top surface of the frozen meat layer 18 so that the patty 106 will not be ejected through the opening 110 in the patty-forming table 30. Therefore, the cutter 92 is provided with vacuum breaking holes 112 which admit air between the lower surface of the cutter 92 and the upper surface of the patty 106 to relieve the vacuum and therefore permit the patty to drop through the aperture 110 to the conveyor 108. In the vent that the vacuum breaking holes 112 do not provide sufficient air to force the patty 106 from the cutter 92, it may be necessary to vent air from the exit port 100 of the cylinder 96 into the holes 112 to force the patty 106 from the cutter 92.

CONCLUSION

Although preferred embodiments of the invention have been illustrated and described, it should be understood that the invention is not intended to be limited to the specifics of these embodiments, but rather is defined by the accompanying claims.

What is claimed is:

1. Apparatus for freezing a ground meat product into a sheet of predetermined thickness and for forming meat patties therefrom, said apparatus comprising:
   a rotatable refrigerated drum having a heat conductive cylindrical surface;
   extruding means for applying the ground meat product as a sheet upon the exterior surface of said drum, the temperatures of the drum surface and ground meat product being selected to cause adhesion of the ground meat product to the drum surface;
   at least one compression roll positioned downstream of said extruding means and parallel with the rotatable axis of said drum, said roll being spaced a predetermined distance from the exterior surface of said drum for compressing said meat product to the desired predetermined thickness;
   scraping means positioned downstream of said roll for stripping the sheet of meat product from the surface of said drum;
   a patty-forming table positioned for receiving said sheet from said scraping means; and
   at least one bank of cutters positioned above said table and aligned across said sheet of meat product, said bank comprising at least one cutter assembly having a sharpened blade conforming to the desired shape of the patty and actuating means coupled to said cutter for driving said cutter through said sheet of meat product.

2. The apparatus claimed in claim 1 wherein said cutter assembly includes: a cutter blade bounded by a cutting edge and having a peripheral shape corresponding to the desired shape of the frozen patty, said blade being driven for reciprocating movement through a similarly shaped opening in the flat top surface of said patty-forming table to form frozen patties that are ejected through said openings as the blade passes therethrough.

3. The apparatus claimed in claim 1 wherein said cutter assembly includes:
   a tubular piston slidably mounted in a structural member positioned over said patty-forming table, said piston supporting a flange in a plane normal to the axis of said piston, said flange having a peripheral shape substantially identical to that of the patty to be formed;
   a cutter blade connected to the periphery of said flange;
   a stripper plate positioned within the cavity formed by said cutter blade and said flange;
   a stripper shaft supporting said stripper plate and slidably positioned within the bore of said tubular piston;
   spring means in the bore of said piston between the closed end of said piston and the end of said stripper shaft for urging said shaft and said stripper plate outward from said cavity; and,
   stop means connecting said tubular piston with said shaft for preventing said stripper plate from moving more than a predetermined distance from said flange.

4. The apparatus claimed in claim 3 in which said stripper plate shaft is tubular and contains a slidably mounted rod, the top end of said rod being connected to said tubular piston for movement therewith, the bottom end of said rod being substantially coplanar with the cutting edge of said cutting blade, said bottom end being sharpened for punching a central hole through the patty being formed from the sheet of meat product.

5. The apparatus claimed in claim 1 further including a flexible resilient apron interposed between said scraping means and said forming table, said apron being slidably coupled to said table for resiliently supporting said sheet of meat product.

6. The apparatus claimed in claim 5 including at least two banks of cutters positioned above said patty-forming table, each of said banks having at least two cutter assemblies, the cutter assemblies of said respective banks being aligned and said banks being generally parallel to one another.

7. The apparatus claimed in claim 5 including at least two banks of cutters positioned above said patty-formimg table, each of said banks having at least two cutter assemblies, the assemblies in one of said banks being staggered in close proximity with assemblies in the other bank.

8. The apparatus claimed in claim 6 further including a patty slide coupled to the downstream end of said patty-forming table for transferring formed patties from said table to a first conveying means, said slide having portions aligned with said cutters and narrower than the width of the patties being cut to enable waste meat product that is formed between adjacent patties to drop between said portions to a collector.

9. The apparatus claimed in claim 8 wherein said collector returns said waste meat product to a mixing means to be mixed with new meat product being admitted to the apparatus.

10. Apparatus for forming frozen meat patties from a ground meat product, said apparatus comprising:
    a rotatable refrigerated drum having a heat conductive cylindrical surface;
    extruding means for applying the ground meat product as a sheet upon the exterior surface of said drum, the temperatures of the drum surface and ground meat product being selected to cause adhesion of the ground meat product to the drum surface;

at least one compression roll positioned downstream of said extruding means, said roll being spaced a predetermined distance from the exterior surface of said drum for compressing said meat product in order to achieve the desired predetermined thickness and to facilitate heat transfer between the cylindrical drum surface and the meat product;

scraping means positioned downstream of said roll for stripping the frozen meat product from the surface of said drum; and means for forming patties of selected shape in said sheet of ground meat product.

11. The apparatus of claim 10 wherein said patty forming means is positioned for receiving said sheet of meat product from said scraping means.

* * * * *